US009583033B2

(12) United States Patent
Yun et al.

(10) Patent No.: US 9,583,033 B2
(45) Date of Patent: Feb. 28, 2017

(54) DISPLAY PANEL FOR DISPLAY DEVICE AND METHOD FOR DETECTING DEFECTS OF SIGNAL LINES FOR DISPLAY DEVICES

(75) Inventors: Soon-Il Yun, Paju-si (KR); Du-Hwan Oh, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 1062 days.

(21) Appl. No.: 13/479,782

(22) Filed: May 24, 2012

(65) Prior Publication Data

US 2013/0134986 A1 May 30, 2013

(30) Foreign Application Priority Data

Nov. 25, 2011 (KR) ........................ 10-2011-0124437
Apr. 27, 2012 (KR) ........................ 10-2012-0044758

(51) Int. Cl.
*G02F 1/13* (2006.01)
*G09G 3/00* (2006.01)
*G09G 3/20* (2006.01)
*G09G 3/32* (2016.01)

(52) U.S. Cl.
CPC ............... *G09G 3/006* (2013.01); *G09G 3/20* (2013.01); *G09G 3/3233* (2013.01)

(58) Field of Classification Search
CPC ........... G09G 2330/021; G09G 3/3648; G09G 2310/027; G09G 2310/0289; G09G 3/3225
See application file for complete search history.

(56) References Cited

U.S. PATENT DOCUMENTS

| | | | | |
|---|---|---|---|---|
| 7,053,645 | B2 * | 5/2006 | Chung | G09G 3/006 324/760.02 |
| 8,610,703 | B2 * | 12/2013 | Kouno | 345/212 |
| 2002/0075419 | A1 | 6/2002 | Kwon et al. | |
| 2006/0028408 | A1 * | 2/2006 | Kim | 345/76 |
| 2006/0125510 | A1 | 6/2006 | Brunner et al. | |
| 2009/0058889 | A1 | 3/2009 | Nishimura | |
| 2009/0096770 | A1 | 4/2009 | Kawabe | |
| 2010/0007369 | A1 | 1/2010 | Kwak | |

(Continued)

FOREIGN PATENT DOCUMENTS

| | | | |
|---|---|---|---|
| CN | 101364022 | A * | 2/2009 |
| CN | 101364022 | A | 2/2009 |

(Continued)

OTHER PUBLICATIONS

German Patent and Trademark Office, Office Action, German Patent Application No. DE 10 2012 107 620.0, Feb. 18, 2015, eleven pages.

(Continued)

*Primary Examiner* — Alesa Allgood
(74) *Attorney, Agent, or Firm* — Fenwick & West LLP

(57) ABSTRACT

A display panel for display devices which enables precisely determining whether or not adjacent signal lines are shorted or opened and a method for detecting defects of the signal lines are disclosed. The display panel includes a substrate on which a plurality of signal lines to transmit various signals required by pixels is formed, and one of any two adjacent signal lines is connected to at least one of main signal transmission lines and the other one of the two adjacent signal lines is maintained in a floating state.

24 Claims, 15 Drawing Sheets

(56) References Cited

U.S. PATENT DOCUMENTS

| | | | | |
|---|---|---|---|---|
| 2010/0097297 | A1* | 4/2010 | Jiang | G09G 3/006 345/55 |
| 2010/0103184 | A1 | 4/2010 | Chen | |
| 2010/0182292 | A1* | 7/2010 | Kouno | 345/205 |
| 2012/0062263 | A1* | 3/2012 | Lan | G09G 3/006 324/760.01 |

FOREIGN PATENT DOCUMENTS

| | | | |
|---|---|---|---|
| CN | 101783121 | A | 7/2010 |
| KR | 10-2005-0038133 | A | 4/2005 |
| KR | 10-2007-0055844 | A | 5/2007 |
| TW | 581922 | B | 4/2004 |
| TW | I321303 | B | 3/2010 |
| TW | I325495 | B | 6/2010 |
| WO | WO 2004/099866 | A1 | 11/2004 |

OTHER PUBLICATIONS

State Intellectual Property Office of the People's Republic of China, First Office Action, Chinese Patent Application No. 201210297467.8, Feb. 27, 2015, thirteen pages.

Taiwan Intellectual Property Office, First Office Action, Taiwan Patent Application No. 101129213, Jan. 21, 2015, six pages.

Korean Intellectual Property Office, Office Action, Korean Patent Application No. 10-2012-0044758, Mar. 31, 2014, five pages [with concise explanation of relevance in English].

* cited by examiner

DISPLAY PANEL FOR DISPLAY DEVICE AND METHOD FOR DETECTING DEFECTS OF SIGNAL LINES FOR DISPLAY DEVICES

CROSS-REFERENCE TO RELATED APPLICATIONS

This application claims priority under 35 U.S.C. §119(a) from Republic of Korea Patent Application No. 10-2011-0124437 filed on Nov. 25, 2011 and from Republic of Korea Patent Application No. 10-2012-0044758 filed on Apr. 27, 2012, which is hereby incorporated by reference as if fully set forth herein.

BACKGROUND OF THE INVENTION

Field of the Invention

The present invention relates to a display device, and more particularly, to a display panel for display devices which precisely determines whether or not adjacent signal lines are shorted and/or opened and a method for detecting defects of signal lines for display devices.

Discussion of the Related Art

Display devices, such as a liquid crystal display device, a plasma display device and a light emitting display device, generally go through several test processes before they are put on the market.

These various processes include a process of testing short and open conditions of signal lines, such as gate lines and data lines.

However, as display devices are scaled up, the number of signal lines is increased in proportion to the size of the display device, and thus signal lines are more densely formed on the display devices. Particularly, in order to compensate for current driving capability of drive switching elements, a light emitting diode display device requires a large number of switching elements and various drive signals supplied thereto. Thereby, the space between signal lines is inevitably reduced.

Therefore, in conventional display devices, signal waveforms detected from adjacent signal lines are almost similar due to signal interference between the adjacent signal lines, and thus detection as to whether or not the respective signal lines are shorted and/or opened and the precise location of the shorted and/or opened signal lines may be difficult to determine.

SUMMARY

Embodiments include a display panel for display devices having a structure of signal lines that allows adjacent signal lines to have different electrical connection methods, and thus increases the difference in resistance between the adjacent signal lines and eliminates signal interference between the adjacent signal lines. Beneficially, it is possible to precisely determine whether or not the respective signal lines are shorted and whether or not the plurality of signal lines are opened. Embodiments also include a method for detecting defects of signal lines for display devices having such structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a display panel for display devices includes signal lines formed on a substrate to transmit signals required to control pixels of the display panel, where some selected ones of the signal lines are couple to one of a plurality of main transmission lines and remaining ones of the signal lines are maintained in an electrical state different from the selected ones of the signal lines, such as a floating state. For example, every other signal line may be coupled to one of the main signal transmission lines, and the remaining signal lines may be maintained in a floating state.

In one embodiment, a display panel for display devices includes a substrate on which a plurality of signal lines to transmit various signals required by pixels is formed, wherein for any two adjacent signal lines, one of the two adjacent signal lines is coupled to at least one of main signal transmission lines, and the other one of the two adjacent signal lines is maintained in a floating state.

The $n^{th}$ signal lines from among the plurality of signal lines may be maintained in the floating state, the remaining signal lines except for the $n^{th}$ signal lines may be coupled to the main signal transmission lines, and n may be 2m−1 (m being a natural number) or 2m.

The main signal transmission lines and the plurality of signal lines may be located in different layers such that a gate insulating layer is interposed therebetween, and the remaining signal lines except for the $n^{th}$ signal lines may be coupled to the main signal transmission lines through contact holes passing through the gate insulating layer.

The substrate may be divided into a display area in which the pixels are to be formed, a non-display area in which driving integrated circuits supplying signals to drive the pixels are to be mounted, and a shorting bar area in which a plurality of shorting bars are to be formed. The plurality of shorting bars may be formed on the same layer as the main signal transmission lines, and the $n^{th}$ signal lines may be respectively coupled to the plurality of shorting bars through a plurality of connection lines.

The plurality of connection lines and the plurality of signal lines may be located in different layers with a passivation layer interposed therebetween, and the plurality of connection lines and the plurality of shorting bars may be formed in different layers with the gate insulating layer and the passivation layer interposed therebetween. One ends of the plurality of connection lines may be coupled to the $n^{th}$ signal lines through a plurality of contact holes passing through the passivation layer, and the other ends of the plurality of connection lines may be coupled to the plurality of shorting bars through a plurality of contact holes passing through the gate insulating layer and the passivation layer.

The main signal transmission lines and the plurality of shorting bars may be formed of the same material, the plurality of signal lines may be formed of the same material, the plurality of connection lines may be formed of the same material, and the materials of the main signal transmission lines, the plurality of signal lines and the plurality of connection lines may be different.

The plurality of connection lines may be formed of indium-tin-oxide (ITO) or a molybdenum alloy (MoX).

The main signal transmission lines may include first and second main signal transmission lines, and one ends of the remaining signal lines except for the $n^{th}$ signal lines may be alternately connected to the first main signal transmission line or the second main signal transmission line.

In another aspect of the present invention, a method for detecting defects of signal lines for display devices includes, for any two adjacent signal lines, coupling one of the two adjacent signal lines to at least one of main signal transmission lines, and maintaining the other one of the two adjacent signal lines in a floating state, applying an input test signal to one ends of the plurality of signal lines, and determining whether or not the plurality of signal lines is shorted and whether or not the plurality of signal lines is opened by analyzing a waveform of output test signals output from the other ends of the plurality of signal lines.

The $n^{th}$ signal lines from among the plurality of signal lines may be maintained in the floating state, the remaining signal lines except for the $n^{th}$ signal lines may be coupled to the main signal transmission lines, and n may be 2m−1 (m being a natural number) or 2m.

The main signal transmission lines and the plurality of signal lines may be located in different layers with a gate insulating layer is interposed therebetween, and the remaining signal lines except for the $n^{th}$ signal lines may be coupled to the main signal transmission lines through contact holes passing through the gate insulating layer.

The input test signal may be a voltage type input test signal.

Determining whether or not the plurality of signal lines is shorted and whether or not the plurality of signal lines is opened is carried out by comparing the waveform of output test signals output from the other ends of the plurality of signal lines with the first and second reference voltages. The first reference voltage may be an average of the maximum peak voltages of the output test signals detected from the $n^{th}$ signal lines in a normal state in which the plurality of signal lines is not shorted or opened. The second reference voltage may be the average of the minimum peak voltages of the output test signals detected from the remaining signal lines except for the $n^{th}$ signal lines in the normal state in which the plurality of signal lines is not shorted or opened. For example, the signal lines in a normal state may be included in a display panel distinct from the tested display panel and known to be free of defects.

When a difference between the maximum peak voltage of the output test signal detected from one $n^{th}$ signal line and the first reference voltage is within a predetermined range, it is determined that the corresponding signal line is not defective. When the difference between the maximum peak voltage of the output test signal detected from the $n^{th}$ signal line and the first reference voltage is greater than the maximum value of the predetermined range, it is determined that the corresponding signal line is opened. When the difference between the maximum peak voltage of the output test signal detected from the $n^{th}$ signal line and the first reference voltage is smaller than the minimum value of the predetermined range, it is determined that the corresponding signal line is shorted. When a difference between the minimum peak voltage of the output test signal detected from one signal line except for the $n^{th}$ signal lines and the second reference voltage is located within a predetermined range, it is determined that the corresponding signal line is not defective. When the difference between the minimum peak voltage of the output test signal detected from the signal line except for the $n^{th}$ signal lines and the second reference voltage is greater than the maximum value of the predetermined range, it is determined that the corresponding signal line is shorted. When the difference between the minimum peak voltage of the output test signal detected from the signal line except for the $n^{th}$ signal lines and the second reference voltage is smaller than the minimum value of the predetermined range, it is determined that the corresponding signal line is opened.

The method may further include dividing the substrate into a display area in which the pixels are to be formed, a non-display area in which driving integrated circuits supplying signals to drive the pixels are to be mounted, and a shorting bar area in which a plurality of shorting bars are to be formed, forming the plurality of shorting bars on the same layer as the main signal transmission lines, and respectively coupling the $n^{th}$ signal lines to the plurality of shorting bars through a plurality of connection lines.

The plurality of connection lines and the plurality of signal lines may be located in different layers with a passivation layer interposed therebetween, the plurality of connection lines and the plurality of shorting bars may be formed in different layers with the gate insulating layer and the passivation layer interposed therebetween, one ends of the plurality of connection lines may be coupled to the $n^{th}$ signal lines through a plurality of contact holes passing through the passivation layer, and the other ends of the plurality of connection lines may be coupled to the plurality of shorting bars through a plurality of contact holes passing through the gate insulating layer and the passivation layer.

The main signal transmission lines and the plurality of shorting bars may be formed of the same material, the plurality of signal lines may be formed of the same material, the plurality of connection lines may be formed of the same material, and the materials of the main signal transmission lines, the plurality of signal lines and the plurality of connection lines may be different from one another.

The plurality of connection lines may be formed of indium-tin-oxide or a molybdenum alloy (MoX).

The main signal transmission lines may include first and second main signal transmission lines, and one ends of the remaining signal lines except for the $n^{th}$ signal lines may be alternately connected to the first main signal transmission line or the second main signal transmission line.

The method may further include determining whether or not the plurality of signal lines is shorted or opened by applying a current type input test signal to the ends of the plurality of signal lines, and finally determining whether or not the plurality of signal lines is shorted or opened based on results of judgment as to whether or not the plurality of signal lines is shorted or opened according to both the current type input test signal and the voltage type input test signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
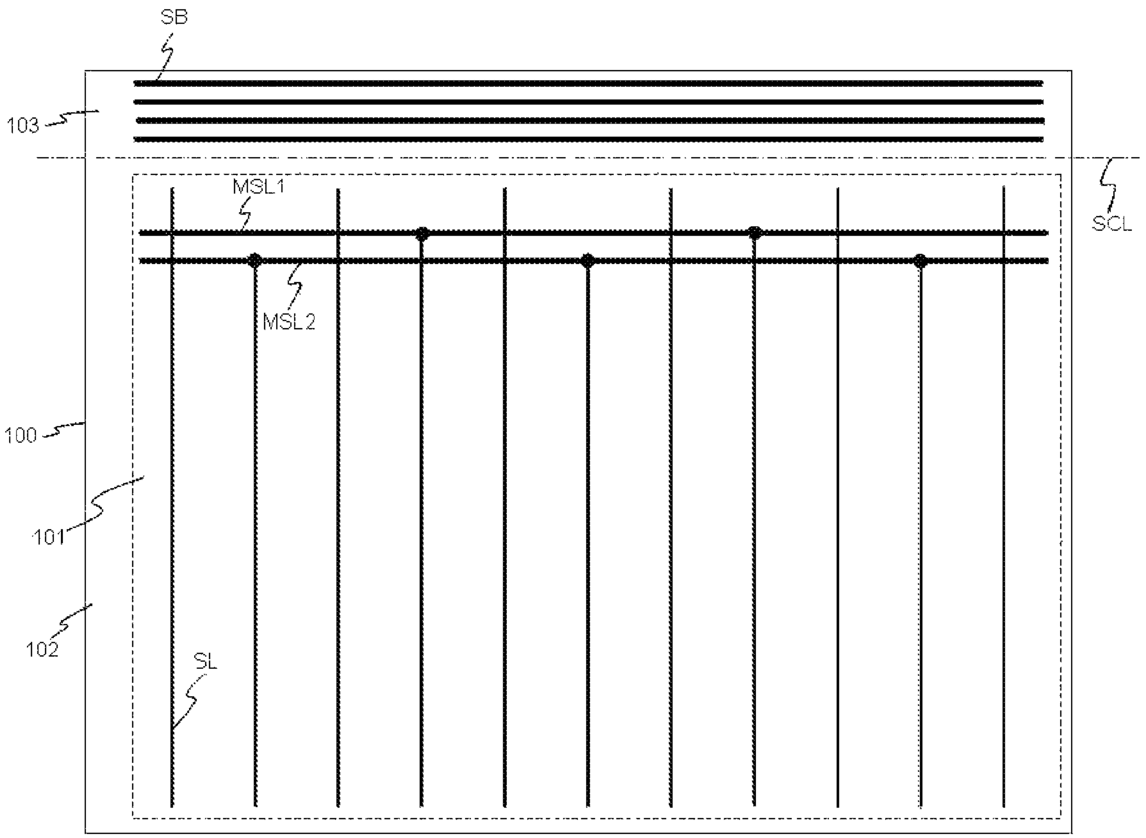
FIG. 1 illustrates a display panel for display devices in accordance with a first embodiment of the present invention.

FIG. 1 illustrates a display panel for display devices in accordance with a first embodiment of the present invention.

The display panel for display devices in accordance with the first embodiment of the present invention, as shown in FIG. 1, includes a substrate 100 on which a plurality of signal lines SL to transmit various signals required by pixels is formed.

The substrate 100 is divided into a display area 101, a non-display area 102 and a shorting bar area 103. The substrate 100 shown in FIG. 1 is a lower substrate from among two substrates of the display panel, and FIG. 1 does not illustrate an upper substrate. The shorting bar area 103 is removed from the substrate 100 after a final test. For example, the shorting bar area 103 is removed from the substrate 100 by cutting the substrate 100 along a scribing line SCL of FIG. 1.

The pixels and the signal lines SL are formed in the display area 101, as described above. Further, first and second main signal transmission lines MSL1 and MSL2 are formed in the display area 101. Alternatively, the first and second main signal transmission lines MSL1 and MSL2 may be formed in the non-display area 102 rather than the display area 101.

The non-display area 102 is an area in which driving integrated circuits to transmit signals to the plural signal lines SL and the main signal transmission lines MSL1 and MSL2 are installed, and the driving integrated circuits are installed after all test processes of the signal lines SL have been completed.

A plurality of shorting bars SB are formed in the shorting bar area 103. The shorting bars SB discharge static electricity generated from the signal lines SL and the main transmission lines MSL1 and MSL2 to the outside, thereby preventing thin film transistors formed in the pixels from being damaged. Further, the shorting bars SB serve to supply various test signals, which are used to detect defects of the pixels, to the pixels.

The structure shown in FIG. 1 is designed to test whether or not the signal lines SL are shorted, and whether or not the signal lines SL are opened. For this purpose, one signal line SL of any two adjacent signal lines SL is coupled to the main signal transmission line MSL1 or MSL2, and the other signal line SL is maintained in a floating state in which the signal line SL is not coupled to any line.

That is, the $n^{th}$ signal lines SL from among the signal lines SL are maintained in the floating state, and the remaining signal lines SL except for the $n^{th}$ signal lines SL are coupled to one of the first main signal transmission line MSL1 and the second main signal transmission line MSL2. Here, n is $2m-1$ (m is a natural number) or 2m. For example, as shown in FIG. 1, the odd-numbered signal lines SL from among the plural signal lines SL are not connected to any line and are maintained in the floating state, and one ends of the even-numbered signal lines SL are alternately connected to the first main signal transmission line MSL1 or the second main signal transmission line MSL2.

The first and second main signal transmission lines MSL1 and MSL2 and the shorting bars SB may be formed of a gate metal generally used to manufacture gate lines. For example, the first and second main signal transmission lines MSL1 and MSL2 and the shorting bars SB may be formed of one of an aluminum alloy and a bi-metal layer including aluminum.

The signal lines SL may be formed of a source/drain metal generally used to manufacture data lines. For example, the signal lines may be formed of a metal having high chemical corrosion resistance and mechanical strength, i.e., one of molybdenum (Mo), chromium (Cr), tungsten (W) and nickel (Ni).

The first and second main signal transmission lines MSL1 and MSL2 and the shorting bars SB are formed of the same metal on the same layer through one patterning process.

The signal lines SL are formed of the same metal on the same layer through one patterning process.

The first and second main signal transmission lines MSL1 and MSL2 and the signal lines SL are located in different layers such that a gate insulating layer is interposed therebetween.

The $n^{th}$ signal lines SL (for example, the odd-numbered signal lines SL) from among the plural signal lines SL are not coupled to the first and second main signal transmission lines MSL1 and MSL2. That is, the $n^{th}$ signal lines SL in the floating state are formed on the gate insulating layer, and cross the first and second main signal transmission lines MSL1 and MSL2. On the other hand, $(n+1)^{th}$ signal lines SL (for example, the even-numbered signal lines SL) are coupled to one of the first main signal transmission line MSL1 and the second main signal transmission line MSL2 through contact holes passing through the gate insulating layer.

Due to such a structure, in the present invention, even if the plural signal lines SL are considerably adjacent to each other, it is possible to precisely test whether or not the respective signal lines SL are individually shorted and/or opened. That is, since the adjacent signal lines SL have different electrical connection methods, the adjacent signal lines SL have different resistances. That is, since the resistance of a signal line SL in the floating state is different from the resistance of a signal line SL connected to one main signal transmission line, when an input test signal having the same value is applied to one end of each of the adjacent signal lines SL, output test signals detected from other ends of the adjacent signal lines SL are considerably different. Therefore, even if noise is generated due to signal interference between the adjacent signal lines SL, there is a great difference between the two output test signals and thus the output test signals from the respective signal lines SL may be precisely detected. Accordingly, according to embodiments of the present invention, it is possible to precisely determine whether or not the respective signal lines SL are shorted and/or opened by individually analyzing the values of the output test signals detected from the respective signal lines SL.

Figure 2:
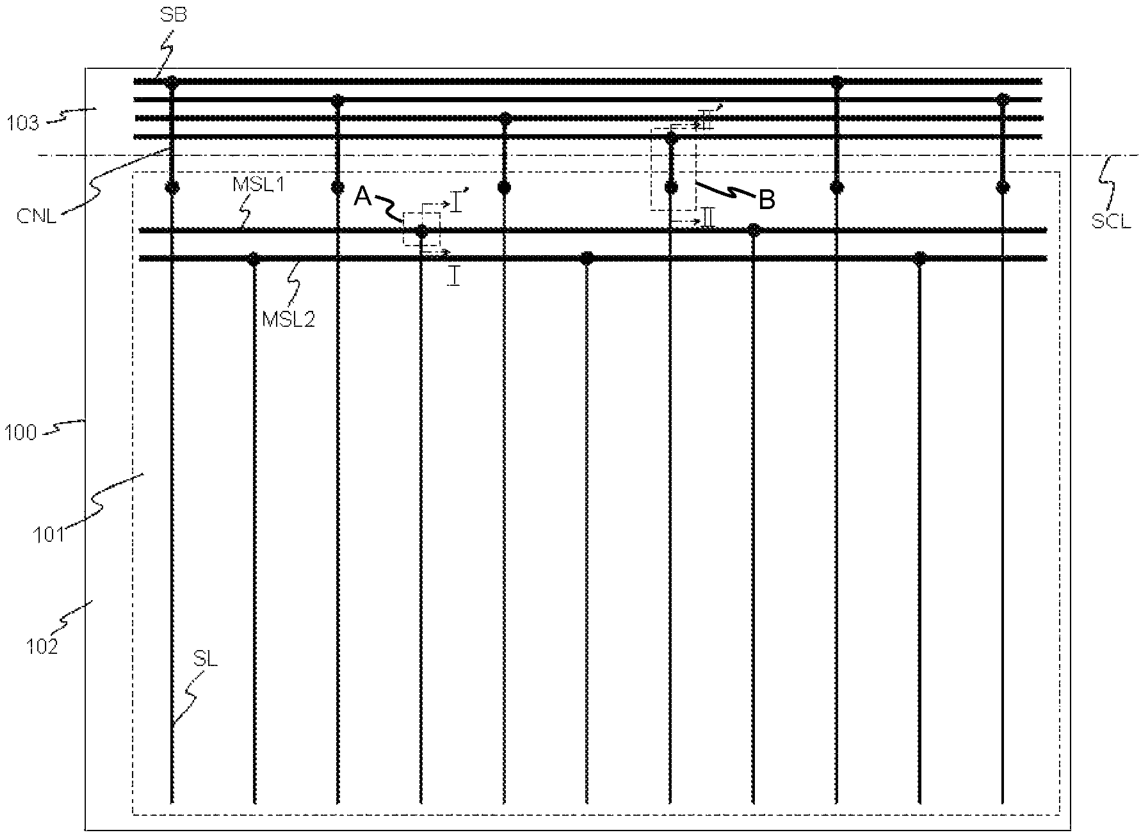
FIG. 2 illustrates the structure of the display panel after an open and short test process of signal lines.

FIG. 2 illustrates the structure of the display panel after an open and short test process of the signal lines.

Upon determining that the respective signal lines SL are not defective through the short and open test process of the signal lines SL in the structure of the display panel shown in FIG. 1, a process of testing whether or not respective pixels are defective is performed. In order to perform such a process, a test signal needs to be supplied to the signal lines SL in the floating state. For this purpose, electrical connection between the signal lines SL in the floating state and the shorting bars SB, as shown in FIG. 2, needs to be made prior to the process.

As shown in FIG. 2, the signal lines SL in the floating state are electrically connected to the plural shorting bars SB through connection lines CNL.

The connection lines CNL may be formed of one of indium-tin-oxide and a molybdenum alloy (MoX).

The plural connection lines CNL and the plural signal lines SL in the floating state are located in different layers with a passivation layer interposed therebetween. Further, the connection lines CNL and the shorting bars SB are located in different layers with the gate insulating layer and the passivation layer interposed therebetween.

One ends of the plural connection lines CNL are connected to the signal lines SL in the floating state through plural contact holes passing through the passivation layer. Further, the other ends of the plural connection lines CNL are connected to the plural shorting bars SB through plural contact holes passing through the gate insulating layer and the passivation layer.

Hereinafter, a connection relation between the main signal transmission lines and the signal lines SL and a connection relation between the shorting bars SB and the signal lines SL will be described in detail.

Figure 3:
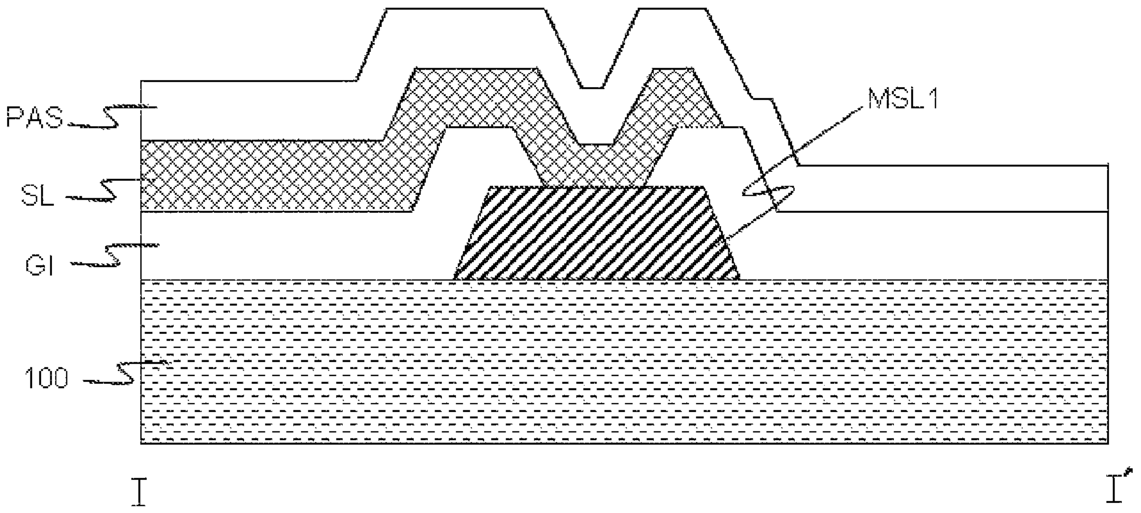
FIG. 3 is a cross-sectional view of the portion A of FIG. 2.

FIG. 3 is a cross-sectional view of the portion A of FIG. 2, i.e., taken along the line I-I' of FIG. 2.

As shown in FIG. 3, the first main signal transmission line MSL1 formed of a gate metal is formed on the substrate 100. The gate insulating layer GI is formed on the first main signal transmission line MSL1. The signal line SL formed of a data metal is formed on the gate insulating layer GI. Here, a contact hole passing through the gate insulating layer GI is formed at the gate insulating layer GI. The contact hole exposes a part of the first main signal transmission line MSL1 located under the gate insulating layer GI. The signal line SL is electrically connected to the first main signal transmission line MSL1 located under the signal line SL through the contact hole. Further, the passivation layer PAS is formed on the first main signal transmission line MSL1 and the gate insulating layer GI.

Figure 4:
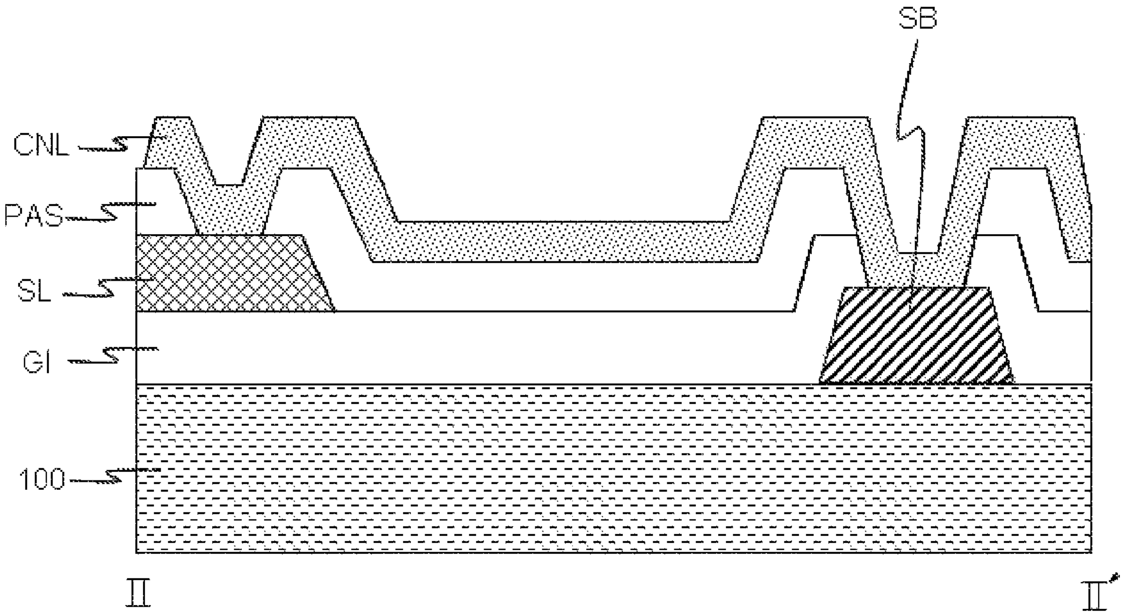
FIG. 4 is a cross-sectional view of the portion B of FIG. 2.

FIG. 4 is a cross-sectional view of the portion B of FIG. 2, i.e., taken along the line II-II' of FIG. 2.

As shown in FIG. 4, the shorting bar SB formed of the gate metal is formed on the substrate 100. The gate insulating layer GI is formed on the shorting bar SB. The signal line SL formed of the data metal is formed on the gate insulating layer GI. The passivation layer PAS is formed on the signal line SL and the gate insulating layer GI. The connection line CNL is formed on the passivation layer PAS. Here, a contact hole passing through the passivation layer PAS is formed at the passivation layer PAS. Such a contact hole exposes a part of the signal line located under the passivation layer PAS. Further, another contact hole sequentially passing through the gate insulating layer GI and the passivation layer PAS is formed at the gate insulating layer GI and the passivation layer PAS. Such a contact hole exposes a part of the shorting bar SB located under the gate insulating layer GI. One end of the connection line CNL is electrically connected to the signal line SL located under the connection line CNL through the former contact hole, and the other end of the connection line CNL is electrically connected to the shorting bar located under the connection line CNL through the latter contact hole. Therefore, the signal line SL in the floating state and the shorting bar SB are electrically connected through the connection line CNL.

The cross-sectional structure shown in FIG. 4 is a structure for the process of testing whether or not the pixels are defective after the short and open test process of the signal lines SL, and thus the connection line CNL of FIG. 4 is not formed during the short and open test process of the signal lines SL. During the short and open test process of the signal lines SL, the contact holes as well as the above-described connection lines CNL may be omitted. That is, the first main signal transmission lines MSL1, the second main signal transmission lines MSL2, the shorting bars SB, the gate insulating layer GI and the passivation layer PAS may be formed prior to the short and open test process of the signal lines SL, and the above-described contact holes (in FIG. 4) and connection lines CNL may be formed after the short and open test process of the signal lines SL has been completed.

In accordance with another embodiment, the first main signal transmission lines MSL1, the second main signal transmission lines MSL2, the shorting bars SB, the gate insulating layer GI and the signal lines SL may be formed prior to the short and open test process of the signal lines SL. The short and open test process of the signal lines SL is executed on such a structure, and then the passivation layer PAS, the contact holes (in FIG. 4) and the connection lines CNL may be formed after the short and open test process of the signal lines SL has been completed.

Figure 5:
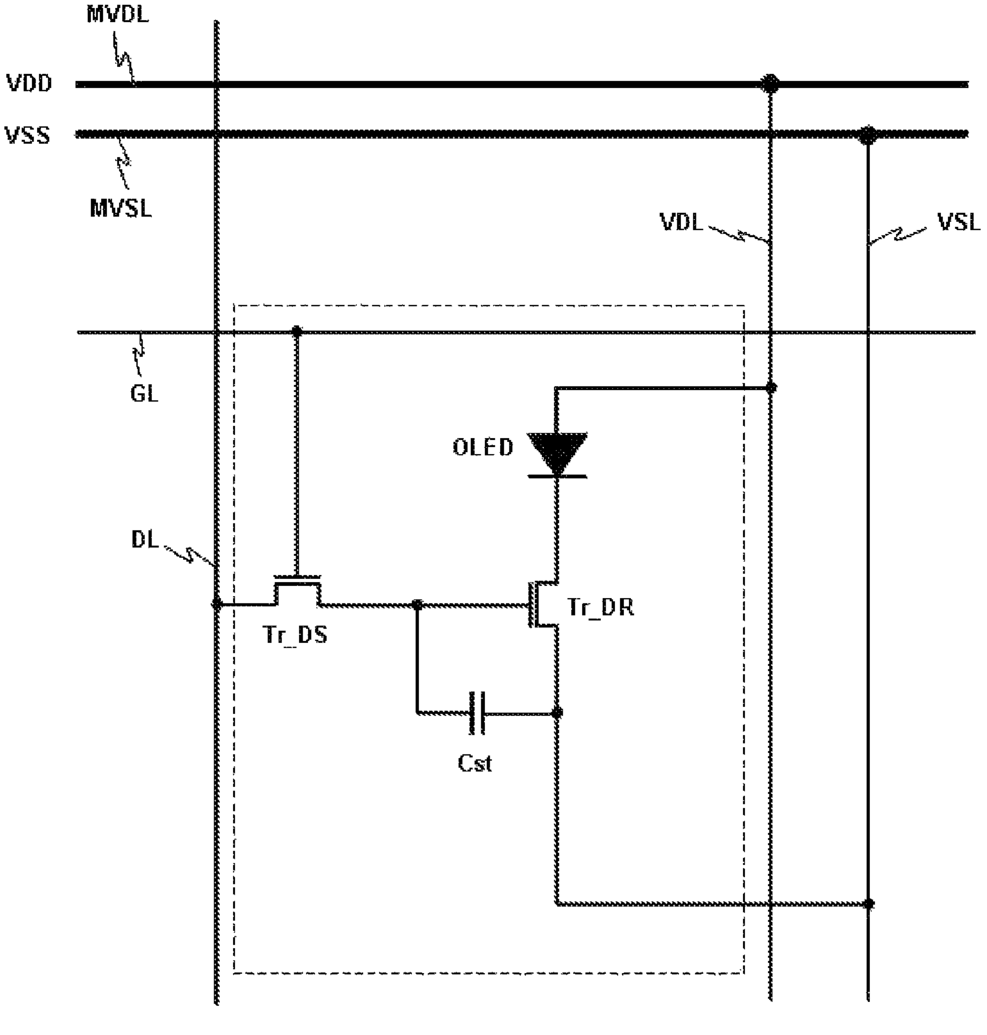
FIG. 5 illustrates the configuration of one pixel of the display panel of FIG. 1.

FIG. 5 illustrates the configuration of one pixel of FIG. 1.

The substrate 100 of FIG. 1 may be a substrate 100 of a light emitting diode display device. Here, one pixel may include, as shown in FIG. 5, a data switching element Tr_DS, a drive switching element Tr_DR, a light emitting diode OLED and a storage capacitor Cst.

The data switching element Tr_DS is controlled by a gate signal from a gate line GL, and is connected between a data line DL and a gate electrode of the drive switching element Tr_DR.

The drive switching element Tr_DR is controlled by a data signal from the data switching element Tr_DS, and is connected between a cathode of the light emitting diode OLED and a second drive line VSL. The second drive line VSL is connected to a second main drive line MVSL transmitting second drive voltage VSS.

The light emitting diode OLED is connected between a first drive line VDL and a drain electrode of the drive switching element Tr_DR. Here, the first drive line VDL is connected to a first main drive line MVDL transmitting first drive voltage VDD.

The storage capacitor Cst is connected between a source electrode and the gate electrode of the drive switching element Tr_DR.

Here, the above-described signal lines SL of FIG. 1 may include the data line DL, the first drive line VDL and the second drive line VSL. For example, the data line DL corresponds to the signal line SL in the floating state of FIG. 1, the first main drive line MVDL corresponding to the first main signal transmission line MSL1 of FIG. 1, the second main drive line MVSL corresponds to the second main signal transmission line MSL2 of FIG. 1, the first drive line VDL corresponds to the signal line SL connected to the first main signal transmission line MSL1 of FIG. 1, and the second drive line VSL corresponds to the signal line SL connected to the second main signal transmission line MSL2.

Hereinafter, a method for detecting defects (short and open) of the signal lines SL for display devices in accordance with the embodiment of the present invention will be described.

Figure 6A:
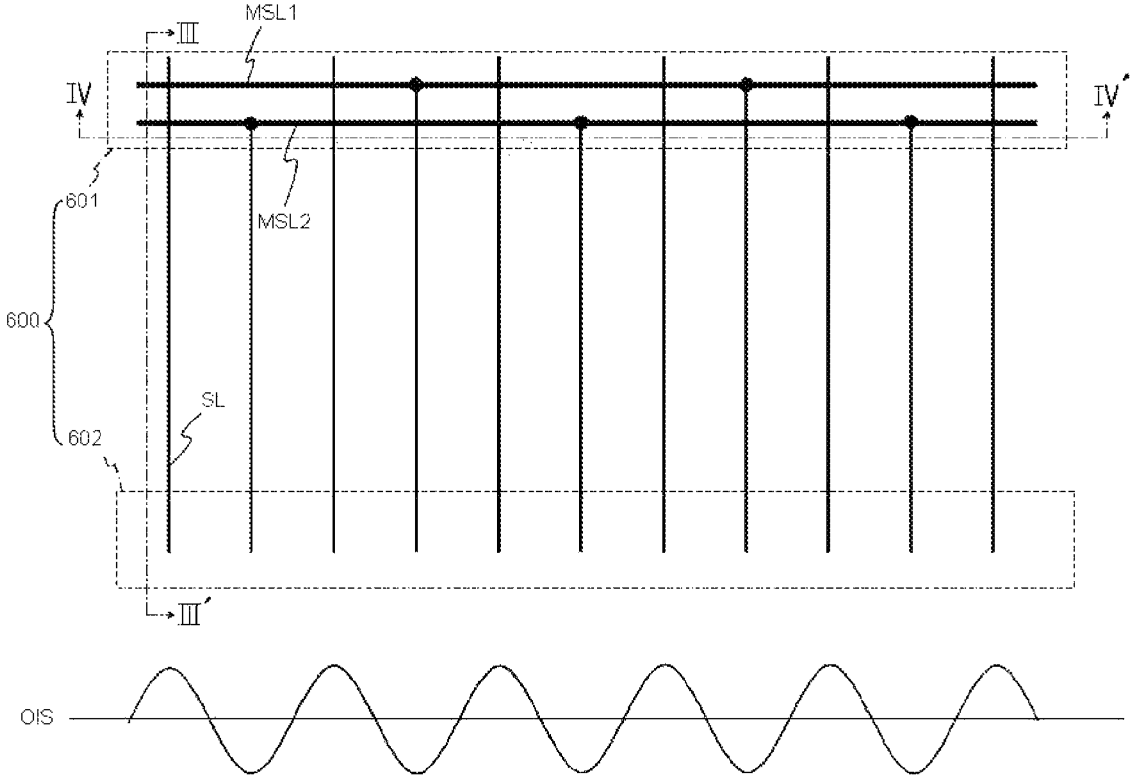
FIGS. 6A to 6C illustrate a method for detecting defects of signal lines for display devices in accordance with embodiments of the present invention.
Figure 6B:
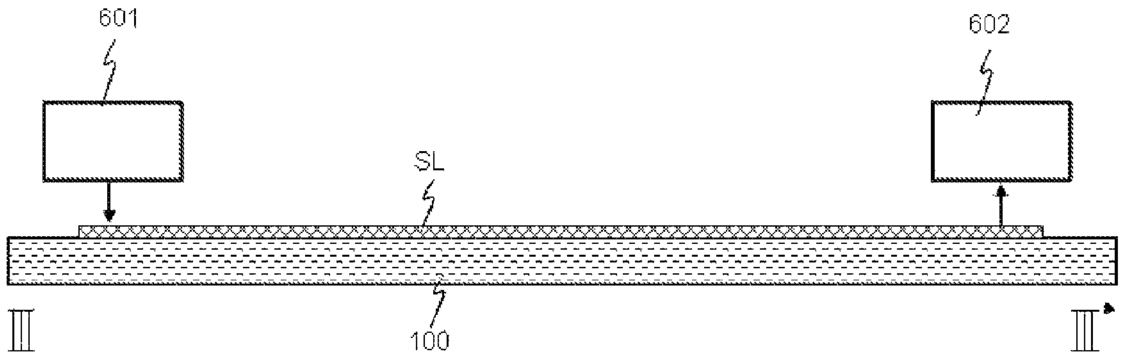
Figure 6C:
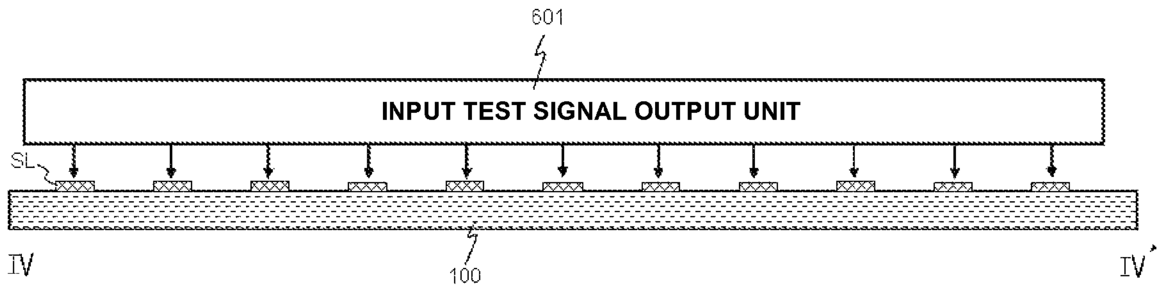

FIGS. 6A to 6C illustrate the method for detecting defects of the signal lines SL for display devices in accordance with the present invention. FIG. 6B is a cross-sectional view taken along the line III-III' of FIG. 6A, and FIG. 6C is a cross-sectional view taken along the line IV-IV' of FIG. 6A.

First, as shown in FIG. 6A, a line testing apparatus 600 is placed on the upper surface of the substrate 100 of FIG. 1. The line testing apparatus 600, as shown in FIG. 6A, includes an input test signal output unit 601 and an output test signal detection unit 602. The input test signal output unit 601 is located above the upper surfaces of one ends of the signal lines SL, and the output test signal detection unit 602 is located above the upper surfaces of the other ends of the signal lines SL. Here, as shown in FIGS. 6B and 6C, the input test signal output unit 601 and the output test signal detection unit 602 do not directly contact the signal lines SL and are distanced from the signal lines SL by a designated interval.

An input test signal output from the input test signal output unit 601 is applied to the ends of the signal lines SL, as shown in FIG. 6C. Then, output test signals OIS are generated from the other ends of the respective signal lines SL as the input test signal is applied to the ends of the signal lines SL. The output test signals OIS generated from the other ends of the signal lines SL are detected by the output test signal detection unit 602.

FIG. 6A illustrates output test signals OIS detected by the output test signal detection unit 602 when none of the signal lines SL are defective, i.e., when none of the signal lines SL are shorted or opened. Here, the output test signals OIS detected from the signal lines SL in the floating state, for example, the output test signals OIS detected from the odd-numbered signal lines SL, have a relatively high peak voltage. On the other hand, the output test signals OIS detected from the signal lines SL connected to one of the first main signal transmission line MSL1 and the second main signal transmission line MSL2, for example, the output test signals OIS detected from the even-numbered signal lines SL, have a relatively low peak voltage. The reason for this is that the odd-numbered signal lines SL in the floating state have higher resistance than the even-numbered signal lines SL. Therefore, the output test signals OIS detected from the respective signal lines SL forms a sine wave having a uniform value when none of the signal lines SL are defective, as shown in FIG. 6A.

Figure 7:
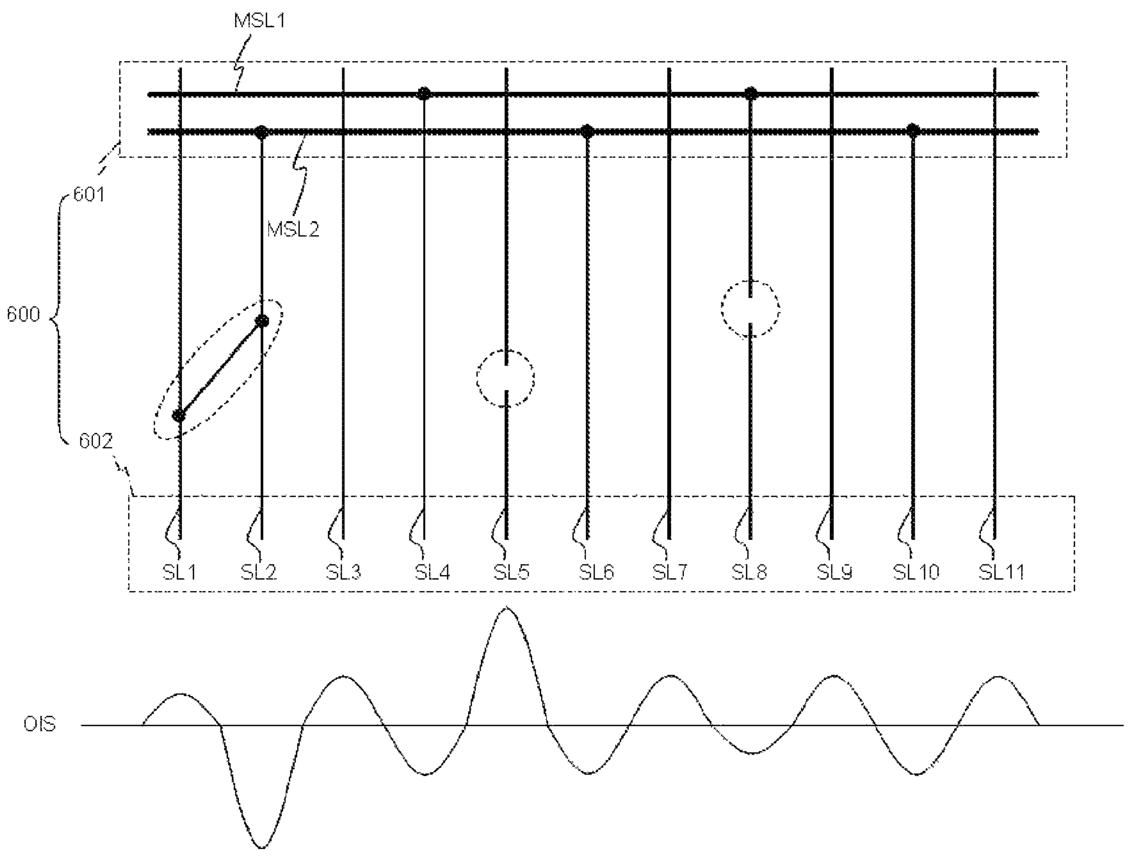
FIG. 7 illustrates a waveform of output test signals if some of the signal lines are shorted and/or opened.

FIG. 7 illustrates a waveform of output test signals OIS when some of the signal lines SL are shorted or opened.

As shown in FIG. 7, when some of the signal lines SL are shorted or opened, output test signals OIS having a different value than those of FIG. 6A are output from the shorted or opened signal lines SL. For example, when all the signal lines SL of FIG. 7 are defined as first to eleventh signal lines SL1 to SL 11 sequentially from the left to the right, peak voltages of output test signals OIS output from the shorted first and second signal lines SL1 and SL2 have lower values than peak voltages output from the signal lines in the normal state. The reason for this is that the first and second signal lines SL1 and SL2 are shorted and thus resistances of the first and second signal lines SL1 and SL2 are relatively decreased. In contrast, peak voltages of output test signals OIS output from the opened fifth and eighth signal lines SL5 and SL8 have higher values than peak voltages output from the signal lines in the normal state. The reason for this is that the fifth and eighth signal lines SL5 and SL8 are opened and thus resistances of the fifth and eighth signal lines SL5 and SL8 are relatively increased.

According to embodiments of the present invention, first and second reference voltages may be set based on the output test signals OIS from the respective signal lines SL in the normal state, as shown in FIG. 6A. For example, the signal lines in a normal state may be included in a display panel distinct from the tested display panel and known to be free of defects. The average of the maximum peak voltages of the output test signals OIS detected from the odd-numbered signal lines SL of FIG. 6A may be calculated, and the calculated average maximum peak voltage may be set as a first reference voltage. In addition, the average of the minimum peak voltages of the output test signals OIS detected from the even-numbered signal lines SL of FIG. 6A may be calculated, and the calculated average minimum peak voltage may be set as a second reference voltage. When a difference between the maximum peak voltage of the output test signal detected from one odd-numbered signal line SL and the first reference voltage is within a predetermined range, it is determined that the corresponding signal line SL is not defective. Also, when a difference between the maximum peak voltage of the output test signal detected from one odd-numbered signal line SL and the first reference voltage is same as the maximum value of the predetermined range or minimum value of the predetermined range, it is determined that the corresponding signal line SL is not defective. On the other hand, when a difference between the maximum peak voltage of the output test signal detected from the odd-numbered signal line SL and the first reference voltage is greater than the maximum value of the predetermined range, it is determined that the corresponding signal line SL is opened. Further, when a difference between the maximum peak voltage of the output test signal detected from the odd-numbered signal line SL and the first reference voltage is smaller than the minimum value of the predetermined range, it is determined that the corresponding signal line SL is shorted.

In the same manner, when a difference between the minimum peak voltage of the output test signal detected from one even-numbered signal line SL and the second reference voltage is within a predetermined range, it is determined that the corresponding signal line SL is not defective. Also, when a difference between the minimum peak voltage of the output test signal detected from one even-numbered signal line SL and the second reference voltage is same as the maximum value of the predetermined range or minimum value of the predetermined range, it is determined that the corresponding signal line SL is not defective. On the other hand, when a difference between the minimum peak voltage of the output test signal detected from the even-numbered signal line SL and the second reference voltage is greater than the maximum value of the predetermined range, it is determined that the corresponding signal line SL is shorted. Further, when a difference between the minimum peak voltage of the output test signal detected from the even-numbered signal line SL and the second reference voltage is smaller than the minimum value of the predetermined range, it is determined that the corresponding signal line SL is opened.

Such determination may be carried out by the output test signal detection unit 602, which result may be displayed on an additional monitor.

The input test signal from the above-described input test signal output unit 601 may be a voltage signal or a current signal. FIGS. 6A and 7 are views when the input test signal is a voltage signal. However, even if a current type input test signal is used, the output test signals OIS detected from the respective signal lines SL may have waveforms similar to those shown in FIGS. 6A and 7.

According to alternative embodiments of the present invention, the input test signal output unit 601 may output both a voltage type input test signal and a current type input test signal. The line testing apparatus 600 including such an input test signal output unit 601 may first apply the voltage type input test signal to the signal lines SL to determine whether or not the signal lines SL are shorted and/or opened, and then apply the current type input test signal to the signal lines SL to determine whether or not the signal lines SL are shorted and/or opened. In this case, whether or not the signal lines SL are shorted and/or opened may be finally determined based on the results of two judgments. That is, the output test signal detection unit 602 compares the results of the two judgments with each other, and informs an operator of the signal lines SL determined to be in the same diagnosis state (the opened state, the shorted state or the normal state) and the signal lines SL determined to be in different diagnosis states. Through the two judgments, accuracy and efficiency of the test may be enhanced.

If the area of the substrate 100 is greater than the area which may be tested by the line testing apparatus 600, the area of the substrate 100 may be divided into a plurality of areas, and the line testing apparatus 600 may be transferred to the divided areas and execute the test on the divided areas so as to test whether or not the signal lines SL are defective.

Figure 8:
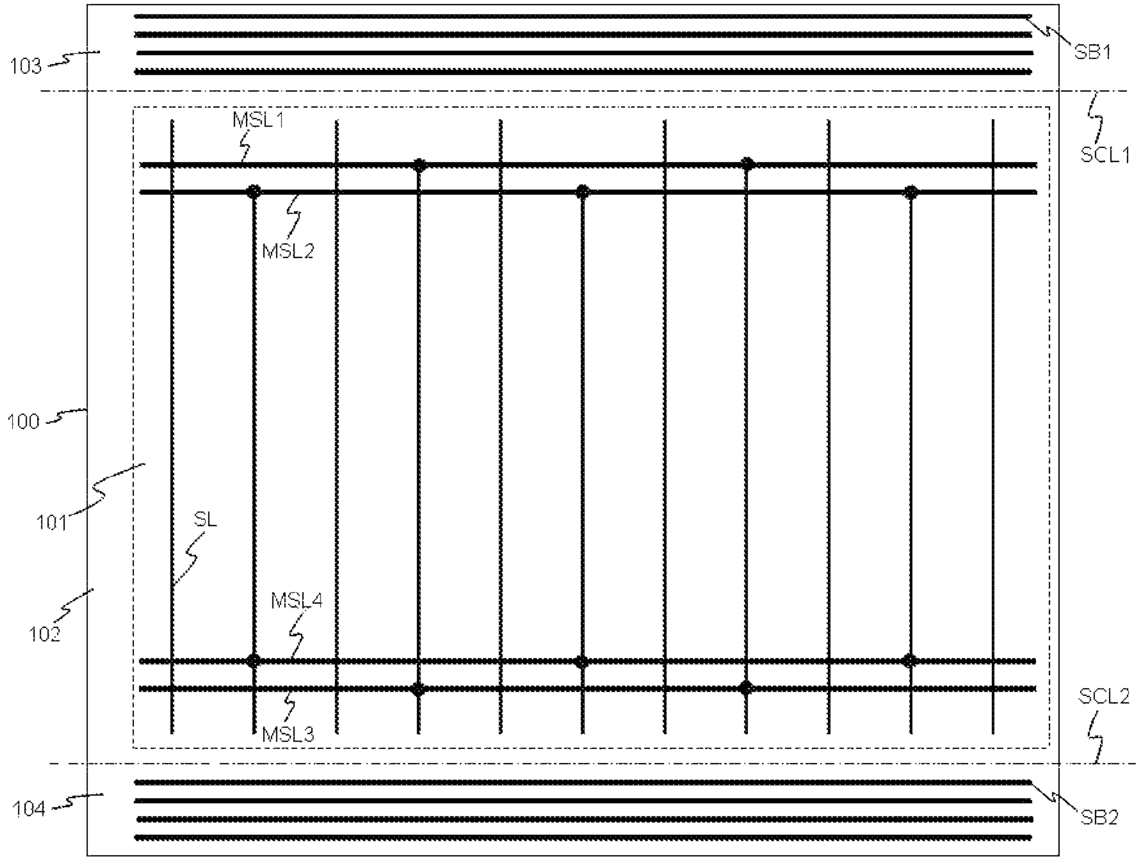
FIG. 8 illustrates a display panel for display devices in accordance with a second embodiment of the present invention.

FIG. 8 illustrates a display panel for display devices in accordance with a second embodiment of the present invention.

The display panel for display devices in accordance with the second embodiment of the present invention, as shown in FIG. 8, includes a substrate 100 on which a plurality of signal lines SL to transmit various signals required by pixels is formed.

The substrate 100 is divided into a display area 101, a non-display area 102, a first shorting bar area 103 and a second shorting bar area 104. The substrate 100 shown in FIG. 8 is a lower substrate from among two substrates of the display panel, and FIG. 8 does not illustrate an upper substrate.

The pixels and the signal lines SL are formed in the display area 101, as described above. Further, first to fourth main signal transmission lines MSL1 to MSL4 are formed in the display area 101. Alternatively, the first to fourth main signal transmission lines MSL1 to MSL4 may be formed in the non-display area 102 rather than the display area 101.

The non-display area 102 is an area in which driving integrated circuits to transmit signals to the plural signal lines SL and the main signal transmission lines MSL1 to MSL4 are installed, and the driving integrated circuits are installed after all test processes of the signal lines SL have been completed.

A plurality of first shorting bars SB1 are formed in the first shorting bar area 103. The first shorting bars SB1 discharge static electricity generated from the signal lines SL and the main transmission lines MSL1 to MSL4 to the outside, thereby preventing thin film transistors formed in the pixels from being damaged. Further, the first shorting bars SB1 serve to supply various test signals, which are used to detect defects of the pixels, to the pixels. The first shorting bar area 103 is removed from the substrate 100 after a final test. For example, the first shorting bar area 103 is removed from the substrate 100 by cutting the substrate 100 along a first scribing line SCL1 of FIG. 8.

A plurality of second shorting bars SB2 are formed in the second shorting bar area 104. The second shorting bars SB2 discharge static electricity generated from the signal lines SL and the main transmission lines MSL1 to MSL4 to the outside, thereby preventing thin film transistors formed in the pixels from being damaged. Further, the second shorting bars SB2 serve to supply various test signals, which are used to detect defects of the pixels, to the pixels. The second shorting bar area 104 is removed from the substrate 100 after the final test. For example, the second shorting bar area 104 is removed from the substrate 100 by cutting the substrate 100 along a second scribing line SCL2 of FIG. 8.

The structure shown in FIG. 8 is designed to test whether or not the signal lines SL are shorted and/or opened. For this purpose, one signal line SL of any two adjacent signal lines SL is connected to two of the main signal transmission lines MSL1 to MSL4, and the other signal line SL is maintained in a floating state in which the signal line SL is not connected to any line.

That is, the $n^{th}$ signal lines SL from among the plural signal lines SL are maintained in the floating state, and the remaining signal lines SL except for the $n^{th}$ signal lines SL are connected to the first and third main signal transmission lines MSL1 and MSL3 or to the second and fourth main signal transmission lines MSL2 and MSL4. Here, n is 2m−1 (m being a natural number) or 2m. For example, as shown in FIG. 8, the odd-numbered signal lines SL from among the plural signal lines SL are not connected to any line and are maintained in the floating state, and one ends of the even-numbered signal lines are alternately connected to the first or second main signal transmission lines MSL1 and MSL2, and the other ends of the even-numbered signal lines are alternately connected to the third or fourth main signal transmission lines MSL3 and MSL4.

The first to fourth main signal transmission lines MSL1 to MSL4 and the first and second shorting bars SB1 and SB2 may be formed of a gate metal generally used to manufacture gate lines. The gate metal is the same as that of the first embodiment.

The signal lines SL may be formed of a source/drain metal generally used to manufacture data lines. The data metal is the same as that of the first embodiment.

The first to fourth main signal transmission lines MSL1 to MSL4 and the first and second shorting bars SB1 and SB2 are formed of the same metal on the same layer through one patterning process.

The signal lines SL are formed of the same metal on the same layer through one patterning process.

The first to fourth main signal transmission lines MSL1 to MSL4 and the signal lines SL are located in different layers.

Here, a gate insulating layer GI is interposed between the first to fourth main signal transmission lines MSL1 to MSL4 and the signal lines SL.

The $n^{th}$ signal lines SL (for example, the odd-numbered signal lines SL) from among the plural signal lines SL are not connected to the first to fourth main signal transmission lines MSL1 to MSL4. That is, the $n^{th}$ signal lines SL in the floating state are formed on the gate insulating layer GI, and cross the first to fourth main signal transmission lines MSL1 to MSL4. On the other hand, $(n+1)^{th}$ signal lines SL (for example, the even-numbered signal lines SL) are connected to the first and third main signal transmission lines MSL1 and MSL3 or to the second and fourth main signal transmission lines MSL2 and MSL4 through contact holes passing through the gate insulating layer GI.

Due to such a structure, in the present invention, even if the plural signal lines SL are considerably adjacent to each other, whether or not the respective signal lines SL are individually shorted and/or opened may be precisely tested. That is, since the adjacent signal lines SL have different electrical connection methods, the adjacent signal lines SL have different resistances. That is, since the resistance of a signal line SL in the floating state is different from the resistance of a signal line SL connected to one main signal transmission line, when an input test signal having the same value is applied to one end of each of the adjacent signal lines SL, output test signals detected from other ends of the adjacent signal lines SL are considerably different. Therefore, even if noise is generated due to signal interference between the adjacent signal lines SL, there is a great difference between two output test signals OIS and thus the output test signals OIS from the respective signal lines SL may be precisely detected. Accordingly, in the present invention, whether or not the respective signal lines SL are shorted and/or opened may be precisely judged by individually analyzing the values of the output test signals OIS detected from the respective signal lines SL.

Figure 9:
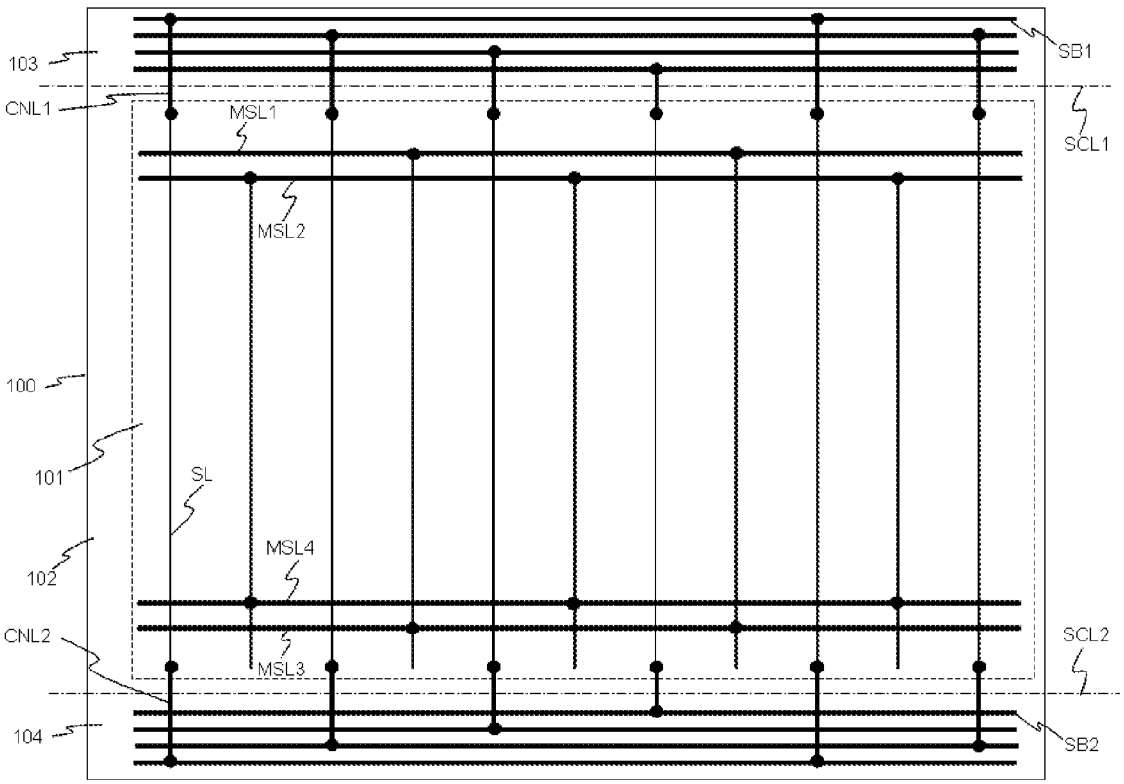
FIG. 9 illustrates the structure of the display panel after a short and open test process of the signal lines.

FIG. 9 illustrates the structure of the display panel after a short and open test process of the signal lines.

Upon determining that the respective signal lines SL are not defective through the short and open test process of the respective signal lines SL in the structure of the display panel shown in FIG. 8, a process of testing whether or not respective pixels are defective is performed. In order to perform such a process, a test signal needs to be supplied to the signal lines SL in the floating state. For this purpose, electrical connection between the signal lines SL in the floating state and the first and second shorting bars SB1 and SB2, as shown in FIG. 9, needs to be made prior to the process.

As shown in FIG. 9, the signal lines SL in the floating state are electrically connected to the first and second shorting bars SB1 and SB2 through first and second connection lines CNL1 and CNL2.

The first and second connection lines CNL1 and CNL2 may be formed of one of indium-tin-oxide and a molybdenum alloy (MoX).

The first and second connection lines CNL1 and CNL2 and the signal lines SL in the floating state are located in different layers with a passivation layer interposed therebetween. Further, the first and second connection lines CNL1 and CNL2 and the first and second shorting bars SB1 and SB2 are located in different layers with the gate insulating layer and the passivation layer interposed therebetween.

One ends of the first connection lines CNL1 are connected to the signal lines SL in the floating state through plural contact holes passing through the passivation layer. Further, the other ends of the first connection lines CNL1 are connected to the first shorting bars SB1 through contact holes passing through the gate insulating layer and the passivation layer.

One ends of the second connection lines CNL2 are connected to the signal lines SL in the floating state through contact holes passing through the passivation layer. Further, the other ends of the second connection lines CNL2 are connected to the second shorting bars SB2 through contact holes passing through the gate insulating layer and the passivation layer.

In the second embodiment of the present invention, the first main signal transmission line MSL1 and the third main signal transmission line MSL3 transmit the same voltage, i.e., first drive voltage, after the final test. In the same manner, the second main signal transmission line MSL2 and the fourth main signal transmission line MSL4 transmit the same voltage, i.e., second drive voltage VSS, after the final test.

The display panel for display devices in accordance with the second embodiment of the present invention is tested in the same manner as that in accordance with the first embodiment of the present invention.

Upon determining that the display panel is not abnormal through completion of the process of testing whether or not the pixels are defective, as shown in FIG. 2, a subsequent process of attaching a data driver to the display panel is performed. This will be described in detail with reference to the accompanying drawings.

Figure 10A:
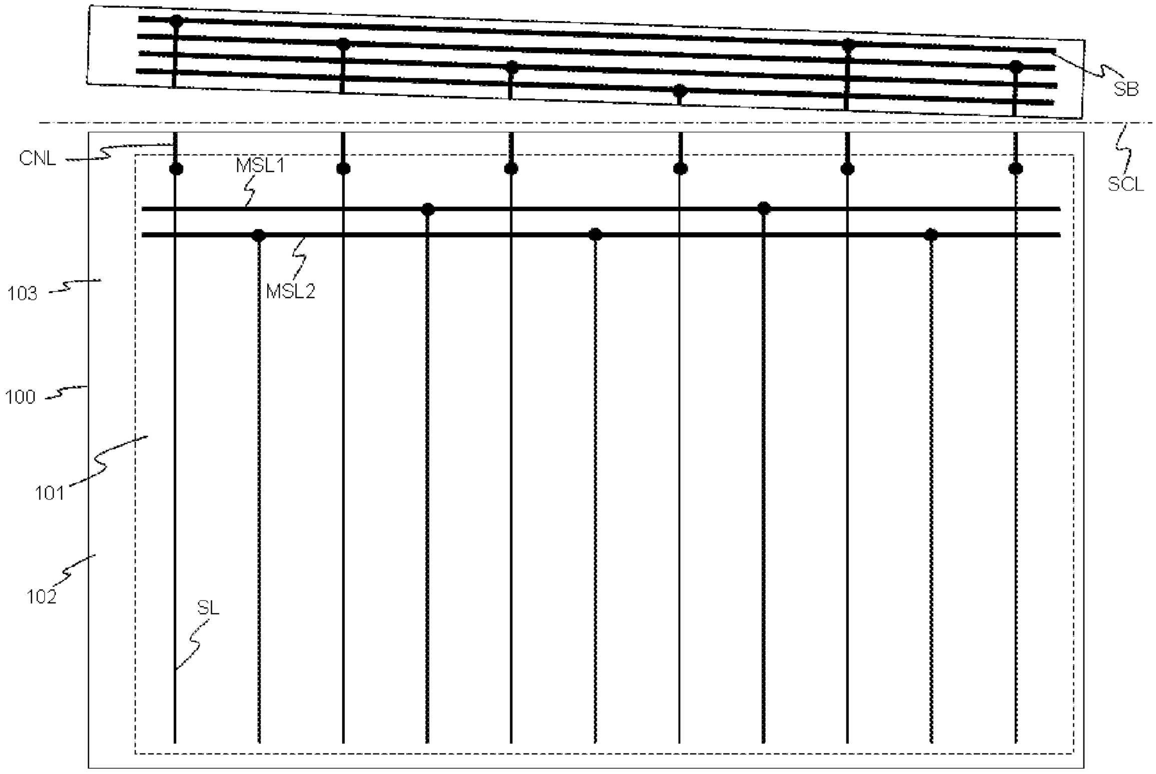
FIGS. 10A and 10B illustrate a process of attaching a data driver to the display panel in accordance with the first embodiment of the present invention.
Figure 10B:
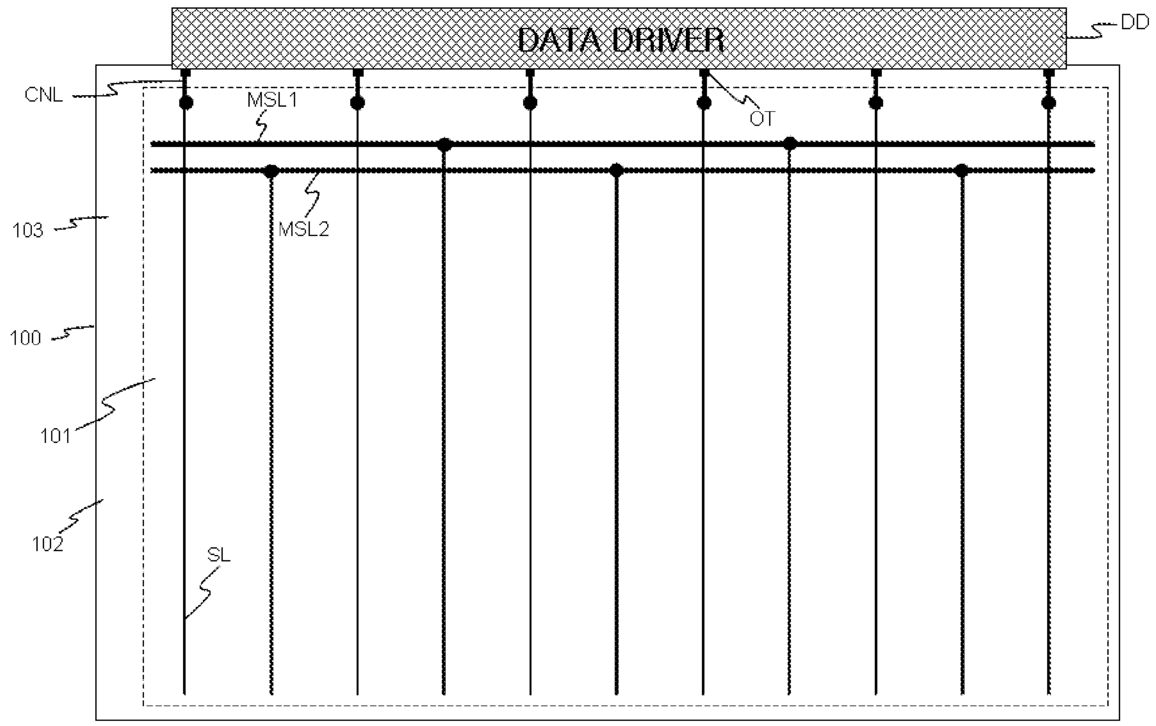

FIGS. 10A and 10B illustrate a process of attaching a data driver to the display panel in accordance with the first embodiment of the present invention.

First, as shown in FIG. 10A, the substrate 100 is cut along the scribing line SCL. Then, the substrate 100 is divided into two pieces along the scribing line SCL. Here, parts of the connection lines CNL located at the intersections with the scribing line SCL are cut off. From among the two pieces of the substrate 100, the piece of the substrate 100 where the shorting bars SB are formed is discarded, and only the piece of the substrate 100 where the display area 101 is formed is used in the subsequent process.

Thereafter, as shown in FIG. 10B, a data driver DD is attached to the cut part of the substrate 100 where the display area 101 is formed. Such a data driver DD may be attached to the substrate 100 in a tape carrier package (TCP) type. Here, output terminals OT of the data driver DD are respectively connected to the connection lines CNL remaining at the cut part of the substrate 100. Thereby, the data driver DD and the signal lines SL in the floating state are connected to each other through the connection lines CNL. Here, the signal lines SL in the floating state are data lines to transmit data signals to the pixels.

As described above, the connection lines CNL and the signal lines SL are located in different layers with the passivation film PAS being interposed therebetween. As a result, one side of each of the connection lines CNL is electrically connected to one side of each of the signal lines SL in the floating state through each of contact holes passing through the passivation film PAS. Further, the other side of each of the connection lines CNL is electrically connected to each of the output terminals OT.

Further, as described above, the signal lines SL and the connection lines CNL are formed of different materials.

A data driver may likewise be attached to the display panel of FIG. 9 through the process shown in FIGS. 10A and 10B. This will be described in detail with reference to the accompanying drawings.

Figure 11A:
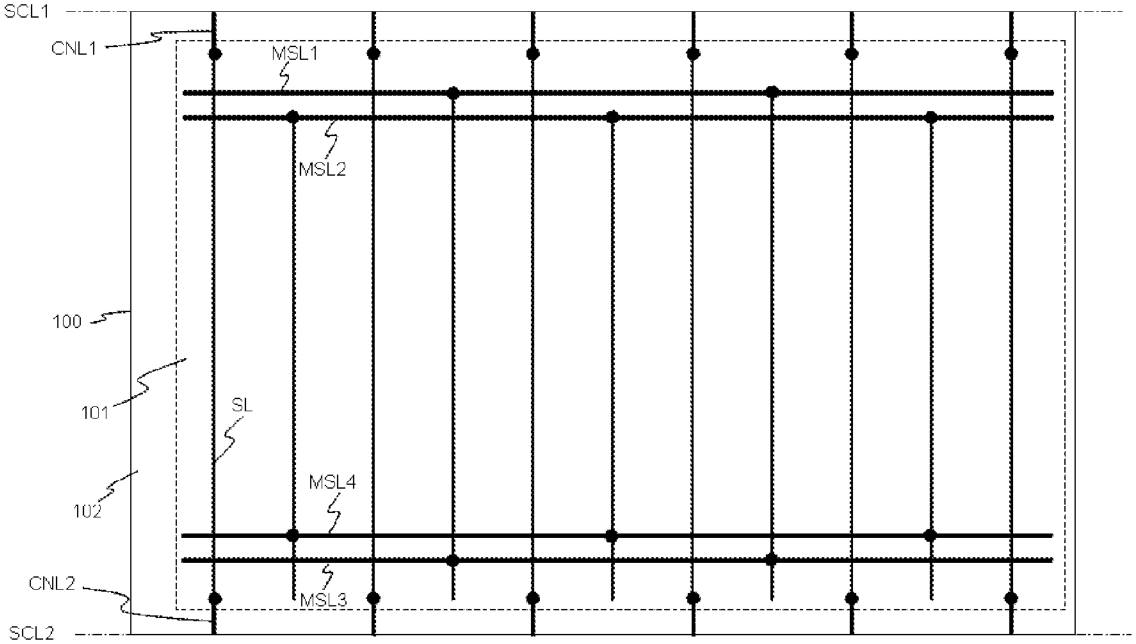
FIGS. 11A and 11B illustrate a process of attaching a data driver to the display panel in accordance with the second embodiment of the present invention.
Figure 11B:
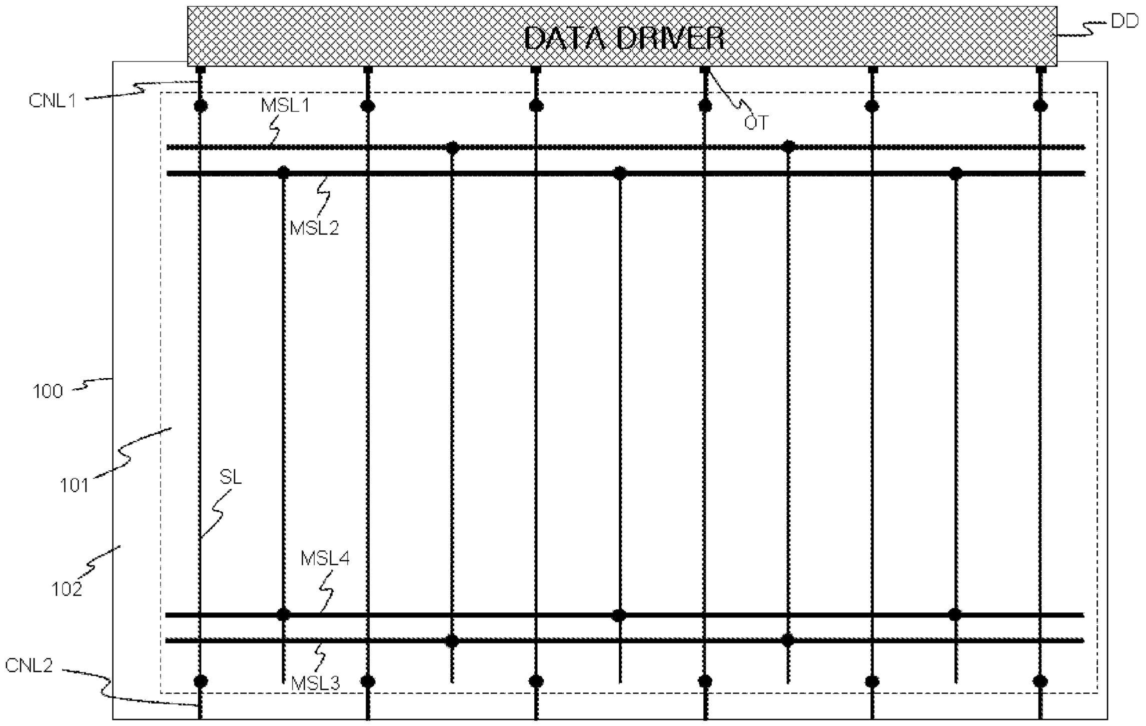

FIGS. 11A and 11B illustrate a process of attaching a data driver to the display panel in accordance with the second embodiment of the present invention.

First, as shown in FIG. 11A, the substrate 100 is cut along the first and second scribing lines SCL1 and SCL2. Then, the substrate 100 is divided into three pieces along the first and second scribing lines SCL1 and SCL2. Here, parts of the first connection lines CNL1 located at the intersections with the first connection line SCL1 are cut off, and parts of the second connection lines CNL2 located at the intersections with the second scribing line SCL2 are cut off. From among the three pieces of the substrate 100, the pieces of the substrate 100 where the first and second shorting bars SB1 and SB2 are formed are discarded, and only the piece of the substrate 100 where the display area 101 is formed is used in the subsequent process.

Thereafter, as shown in FIG. 11B, a data driver DD is attached to the upper cut part of the substrate 100 where the display area 101 is formed. Such a data driver DD may be attached to the substrate 100 in a tape carrier package (TCP) type. Here, output terminals OT of the data driver DD are respectively connected to the first connection lines CNLs remaining at the upper cut part of the substrate 100. Thereby, the data driver DD and the signal lines SL in the floating state are connected to each other through the first connection lines CNL1. Here, the signal lines SL in the floating state are data lines to transmit data signals to the pixels.

As described above, the first connection lines CNL1 and the signal lines SL are located in different layers with the passivation film PAS being interposed therebetween. As a result, one side of each of the first connection lines CNL1 is electrically connected to one side of each of the signal lines SL in the floating state through each of contact holes passing through the passivation film PAS. Further, the other side of each of the first connection lines CNL1 is electrically connected to each of the output terminals OT.

Further, as described above, the signal lines SL and the first connection lines CNL1 are formed of different materials.

Further, the second connection lines CNL2 and the signal lines SL are located in different layers with the passivation film PAS being interposed therebetween. As a result, one side of each of the second connection lines CNL2 is electrically connected to the other side of each of the signal lines SL in the floating state through each of contact holes passing through the passivation film PAS.

Further, as described above, the signal lines SL and the second connection lines CNL2 are formed of different materials.

As apparent from the above description, a display panel for display devices and a method for detecting defects of signal lines for display devices in accordance with the present invention have the following benefits.

Odd-numbered signal lines from among the signal lines of the display panel for display devices in accordance with the present invention are in a floating state, and even-numbered signal lines are connected to main signal transmission lines. Thus, the adjacent signal lines have different resistances. Therefore, in the present invention, even if the plural signal lines are considerably adjacent to each other, when an input test signal having the same value is applied to one end of each of the adjacent signal lines, output test signals detected from other ends of the adjacent signal lines are considerably different. Therefore, even if noise is generated due to signal interference between the adjacent signal lines, there is a great difference between two output test signals and thus the output test signals from the respective signal lines may be precisely detected. Accordingly, in the present invention, whether or not the respective signal lines are shorted and/or opened may be precisely determined by individually analyzing the values of the output test signals detected from the respective signal lines.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display panel for display devices comprising: a substrate on which a plurality of signal lines and a plurality of main signal transmission lines to transmit signals for controlling pixels of the display panel are formed, the plurality of signal lines disposed in a first direction and the plurality of main signal transmission lines disposed in a second direction, wherein one of any two adjacent signal lines is directly connected to at least one of the plurality of main signal transmission lines through which drive voltages are applied to the pixels, and the other one of the two adjacent signal lines is maintained in a floating state in which the other one of the two adjacent signal lines is not connected to any one of the main signal transmission lines during an input test signal being applied to the other one of the two adjacent signal lines to test whether or not the two adjacent signal lines are shorted or opened.

2. The display panel according to claim 1, wherein: nth signal lines from among the plurality of signal lines are maintained in the floating state; remaining signal lines other than the nth signal lines are directly connected to the main signal transmission lines; and n is 2m−1 (m being a natural number) or 2m.

3. The display panel according to claim 2, wherein the main signal transmission lines include first and second main signal transmission lines; and first ends of the remaining signal lines other than the nth signal lines are alternately directly connected to the first main signal transmission line or the second main signal transmission line.

4. The display panel according to claim 2, wherein: the main signal transmission lines include first, second, third, and fourth main signal transmission lines, the first and third main signal transmission lines being driven by a same first voltage, and the second and fourth main signal transmission lines being driven by a same second voltage; and a first subset of the remaining signal lines are directly connected to the first and third main signal transmission lines and a second subset of the remaining signal lines are directly connected to the second and fourth main signal transmission lines.

5. The display panel according to claim 2, wherein:

the main signal transmission lines and the plurality of signal lines are located in different layers such that a gate insulating layer is interposed therebetween; and the remaining signal lines other than the $n^{th}$ signal lines are connected to the main signal transmission lines through contact holes passing through the gate insulating layer.

6. The display panel according to claim 5, wherein:

a plurality of shorting bars are formed on the same layer as the main signal transmission lines; and the $n^{th}$ signal lines are respectively connected to the plurality of shorting bars through a plurality of connection lines after the testing of whether or not the two adjacent signal lines are shorted or opened.

7. The display panel according to claim 6, wherein:

the plurality of connection lines and the plurality of signal lines are formed in different layers with a passivation layer interposed therebetween;

the plurality of connection lines and the plurality of shorting bars are formed in different layers with the gate insulating layer and the passivation layer interposed therebetween;

first ends of the plurality of connection lines are connected to the $n^{th}$ signal lines through a plurality of contact holes passing through the passivation layer; and second ends of the plurality of connection lines are connected to the plurality of shorting bars through a plurality of contact holes passing through the gate insulating layer and the passivation layer.

8. The display panel according to claim 6, wherein:

the main signal transmission lines and the plurality of shorting bars are formed of the same material; and the materials of the main signal transmission lines, the plurality of signal lines and the plurality of connection lines are different from one another.

9. The display panel according to claim 1, further comprising a plurality of connection lines respectively connecting, after the testing of whether or not the two adjacent signal lines are shorted or opened, output terminals of a data driver outputting data signals to the signal lines in the floating state.

10. The display panel according to claim 9, wherein:

the plurality of connection lines and the signal lines are located in different layers with a passivation film interposed therebetween;

one side of each of the plurality of connection lines is connected to a corresponding one of the signal lines in the floating state through a contact hole passing through the passivation film; and the other side of each of the plurality of connection lines is connected to a corresponding one of the output terminals.

11. The display panel according to claim 10, wherein the plurality of connection lines and the signal lines are formed of different materials.

12. A method for detecting defects of signal lines for a display device, the display device including a substrate with a plurality of signal lines and a plurality of main signal transmission lines formed thereon to transmit signals for controlling pixels of the display device, the plurality of signal lines disposed in a first direction and the plurality of main signal transmission lines disposed in a second direction, the method comprising: directly connecting one of any two adjacent signal lines to at least one of the plurality of main signal transmission lines through which drive voltages are applied to the pixels, and maintaining the other one of the two adjacent signal lines in a floating state in which the other one of the two adjacent signal lines is not connected to any one of the main signal transmission lines; applying an input test signal to first ends of the plurality of signal lines to test whether or not the two adjacent signal lines are shorted or opened, the other one of the two adjacent signal lines maintained in the floating state during the input test signal being applied to the other one of the two adjacent signal lines; and determining whether or not the plurality of signal lines is shorted or opened by analyzing a waveform of output test signals output from second ends of the plurality of signal lines.

13. The method according to claim 12, wherein: nth signal lines from among the plurality of signal lines are maintained in the floating state; remaining signal lines other than the nth signal lines are directly connected to the main signal transmission lines; and n is 2m−1 (m being a natural number) or 2m.

14. The method according to claim 13, wherein the input test signal is a voltage type input test signal.

15. The method according to claim 14, further comprising:

determining whether or not the plurality of signal lines are shorted or opened by applying both a voltage type input test signal and a current type input test signal to the ends of the plurality of signal lines as the input test signals.

16. The method according to claim 14, wherein determining whether or not the plurality of signal lines is shorted or opened includes:

comparing output test signals detected from the respective signal lines with first and second reference voltages, wherein the first reference voltage corresponds to an average of the maximum peak voltages of the output test signals detected from the $n^{th}$ signal lines in a normal state in which the plurality of signal lines is not shorted or opened, and the second reference voltage corresponds to an average of the minimum peak voltages of the output test signals detected from the remaining signal lines other than the $n^{th}$ signal lines in the normal state in which the plurality of signal lines is not shorted or opened.

17. The method according to claim 16, wherein:

responsive to a difference between the maximum peak voltage of the output test signal detected from one of the $n^{th}$ signal lines and the first reference voltage being within a predetermined range, determining that said one of the $n^{th}$ signal lines is not defective.

18. The method according to claim 17, wherein:

responsive to the difference between the maximum peak voltage of the output test signal detected from one of the $n^{th}$ signal lines and the first reference voltage being greater than the maximum value of the predetermined range, determining that said one of the $n^{th}$ signal lines is opened.

19. The method according to claim 17, wherein:

responsive to the difference between the maximum peak voltage of the output test signal detected from one of the $n^{th}$ signal lines and the first reference voltage being smaller than the minimum value of the predetermined range, determining that said one of the $n^{th}$ signal lines is shorted.

20. The method according to claim 16, wherein:

responsive to a difference between the minimum peak voltage of the output test signal detected from one of the signal lines other than the $n^{th}$ signal lines and the second reference voltage being within another predetermined range, determining that said one of the signal lines other than the $n^{th}$ signal lines is not defective.

21. The method according to claim 20, wherein:

responsive to the difference between the minimum peak voltage of the output test signal detected from one of the signal lines other than the $n^{th}$ signal lines and the second reference voltage being greater than the maximum value of said another predetermined range, determining that said one of the signal lines other than the $n^{th}$ signal lines is shorted.

22. The method according to claim 20, wherein:

responsive to the difference between the minimum peak voltage of the output test signal detected from one of the signal lines other than the $n^{th}$ signal lines and the second reference voltage being smaller than the minimum value of the said another predetermined range, determining that said one of the signal lines other than the $n^{th}$ signal lines is opened.

23. A display panel for display devices comprising: signal lines formed on a substrate in a first direction and a plurality of main signal transmission lines on the substrate in a second direction to transmit signals for controlling pixels of the display panel, wherein selected ones of the signal lines are directly connected to one of the plurality of main signal transmission lines through which drive voltages are applied to the pixels and remaining ones of the signal lines are maintained in a floating state in which the remaining ones of the signal lines are not connected to any one of the main signal transmission lines during an input test signal being applied to the remaining ones of the signal lines to test whether or not the signal lines are shorted or opened.

24. The display panel of claim 23, wherein every other signal line is directly connected to one of the main signal transmission lines, and the remaining signal lines are maintained in the floating state.

* * * * *